No. 776,023. PATENTED NOV. 29, 1904.
N. T. HARRINGTON.
MOTOR AND FRAME THEREFOR FOR MOTOR VEHICLES.
APPLICATION FILED MAR. 21, 1904.
NO MODEL. 4 SHEETS—SHEET 1.
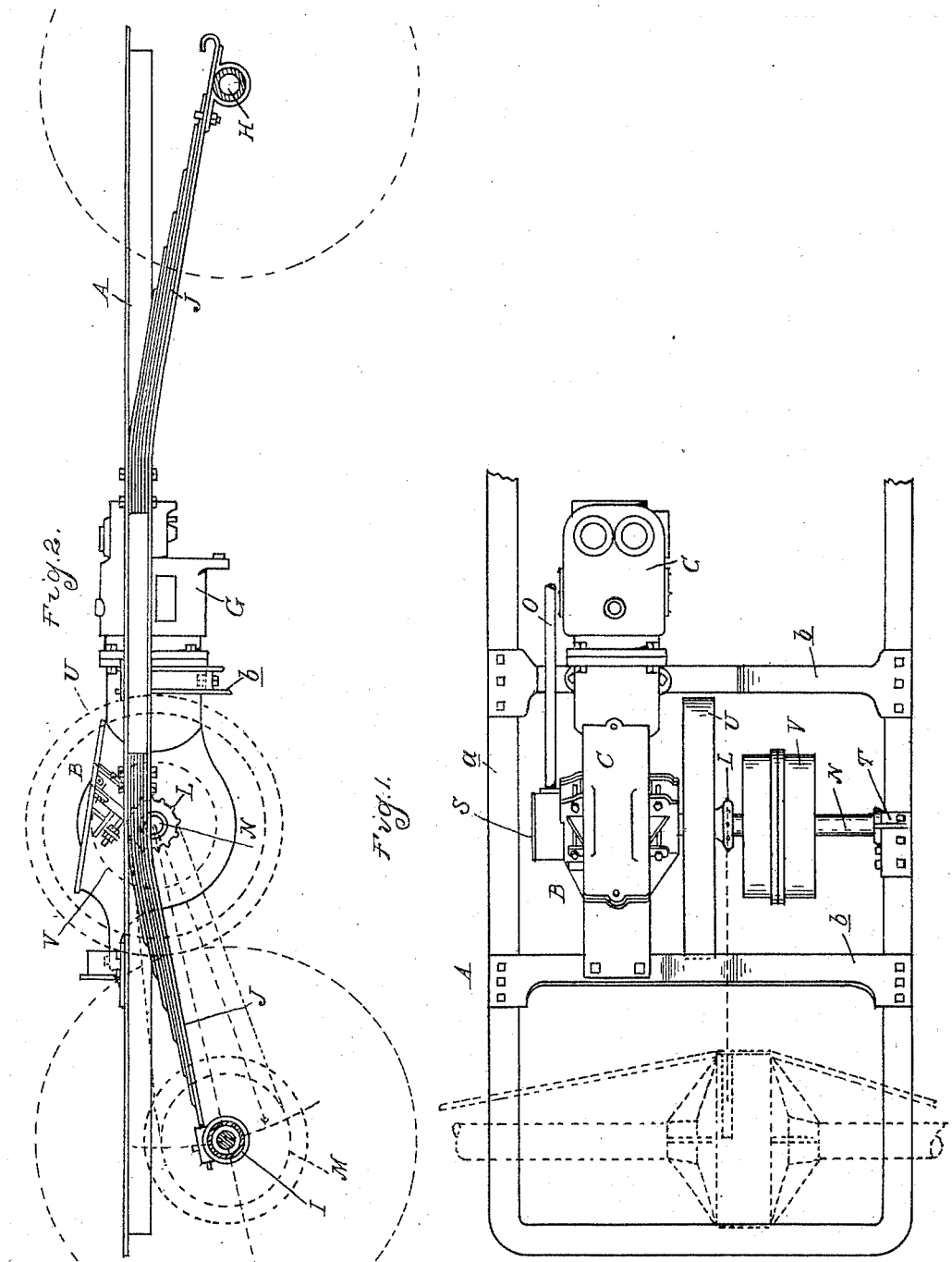
WITNESSES
INVENTOR,
Norman T. Harrington
BY James Whittemore
ATT'Y.

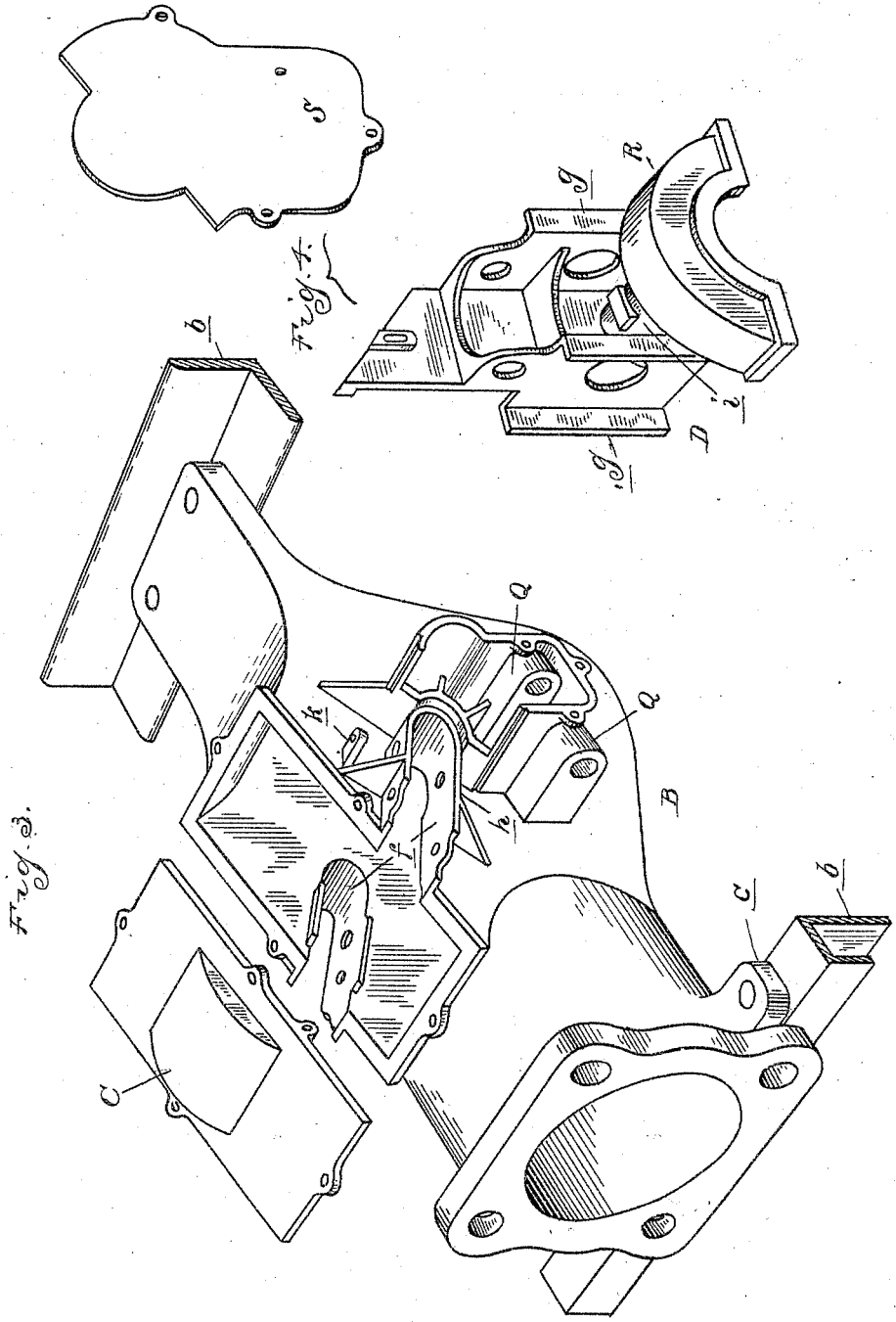

No. 776,023. PATENTED NOV. 29, 1904.
N. T. HARRINGTON.
MOTOR AND FRAME THEREFOR FOR MOTOR VEHICLES.
APPLICATION FILED MAR. 21, 1904.
NO MODEL. 4 SHEETS—SHEET 3.
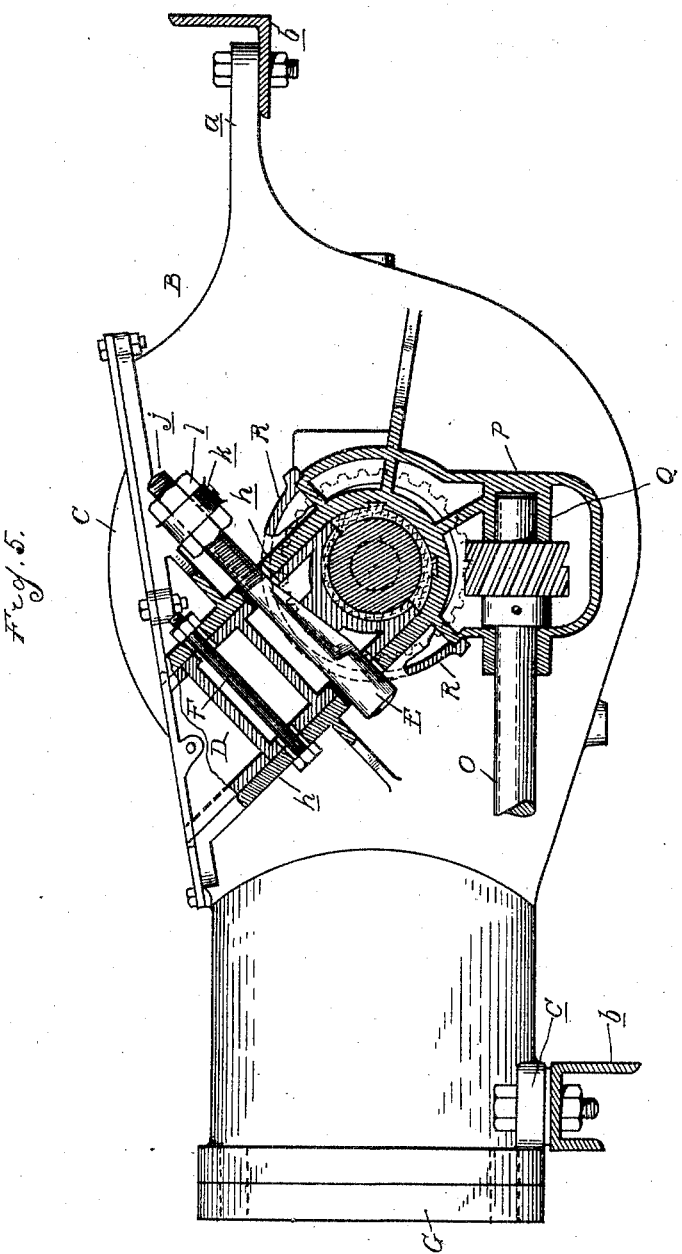
INVENTOR
Norman T. Harrington
WITNESSES
BY James Whittemore
ATT'Y.

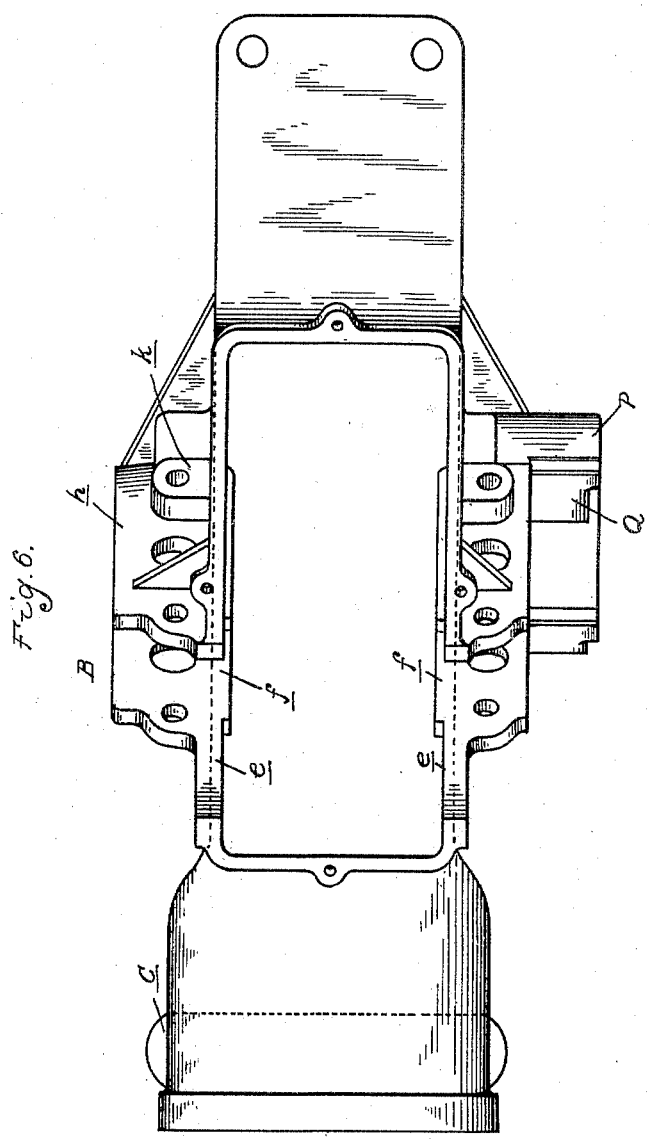

No. 776,023.

Patented November 29, 1904.

UNITED STATES PATENT OFFICE.

NORMAN T. HARRINGTON, OF DETROIT, MICHIGAN, ASSIGNOR TO OLDS MOTOR WORKS, OF DETROIT, MICHIGAN, A CORPORATION OF MICHIGAN.

MOTOR AND FRAME THEREFOR FOR MOTOR-VEHICLES.

SPECIFICATION forming part of Letters Patent No. 776,023, dated November 29, 1904.

Application filed March 21, 1904. Serial No. 199,245. (No model.)

*To all whom it may concern:*

Be it known that I, NORMAN T. HARRINGTON, a citizen of the United States, residing at Detroit, in the county of Wayne and State of Michigan, have invented certain new and useful Improvements in Motors and Frames Therefor for Motor-Vehicles, of which the following is a specification, reference being had therein to the accompanying drawings.

The invention relates to motor-vehicles, and has more particular reference to the construction of the frame and motor therefor, as hereinafter set forth.

In the drawings, Figure 1 is a plan view of the frame and motor. Fig. 2 is a side elevation thereof. Fig. 3 is a perspective view of the engine-casing. Fig. 4 is a perspective view of the detachable bearing cover-plate. Fig. 5 is a section through the bearings, showing the engine-casing in elevation. Fig. 6 is a plan of the crank-case.

A is the frame, which is of substantially rectangular form, comprising the longitudinal side bars $a$ and the cross-bars $b$.

B is the motor-casing. This is arranged longitudinally of the frame A intermediate the bar $a$ and is formed of a crank-casing which extends between the bars $b$, to which it is firmly attached by bolts or other securing devices. Thus the crank-casing forms a strengthening brace or strut between the bars $b$, which increases the rigidity of the structure.

The crank-casing B is preferably formed of a single casting having at one end the lugs $c$ for attachment to one of the bars $b$ and at its opposite end the projecting lug $d$ for attachment to the opposite bar $b$. The intermediate portion is in the form of a hollow casing which is open at its upper end, said opening being adapted to be closed by a cap C, bolted or otherwise secured thereto. The opposite side walls $e$ of the casing are slotted at $f$ for the admission of the boxes or bearings that support the crank-shaft, and these slots are in a plane inclined to the axis of the casing, for the purpose that will be hereinafter set forth.

The lower half-box for the crank-shaft bearing is preferably formed by the projecting flange on the casing, which is babbitted or otherwise bushed for forming a direct bearing for the shaft. The upper half of the bearing is formed by the detachable block D. This is provided upon its opposite sides with guide-flanges $g$, which embrace projecting flanges $h$ on the casing adjacent to the slot $f$. The bearing portion $i$ of this block is formed in the lower end thereof, being babbitted or bushed to correspond with the complementary bearing in the casing.

E is a key for setting up the bearing-block D, which passes through the registering apertures in the flanges $h$ and a keyway in the block D. The outer end of this key is preferably provided with a threaded shank $j$, which passes through the apertured lug $k$ and is secured in different positions of adjustment by clamping-nuts $l$ on opposite sides of said lug.

F is a clamping-bolt which passes through the flanges $h$ and a registering slot in the box D and serves to firmly clamp the flanges against the block to hold the latter in position and to also render the entire casing rigid.

With the construction just described the crank-shaft may be placed in position by first entering it through the slots $f$ until it rests in the lower bearings at the bottom of said slots. The blocks D are then inserted in the slots and the keys E adjusted to set the bearing against the shaft, after which the clamping-bolts F are tightened to render the structure rigid. The cap C may then be placed in position and will complete the closure of the casing, so as to make a practically oil-tight and dust-proof housing.

As has been stated, the casing B forms a rigid bracing-strut between the cross-bar $b$ and serves to increase the rigidity of the frame A. This casing also forms the sole support for the cylinder G, which is bolted or otherwise clamped to the end of the casing B in axial alinement therewith and projects forward of the cross-bar $b$ free from other attachment. Thus whenever it is desired to dismount the engine by removing the block D and detaching the crank-shaft all the working parts can be removed from the casing B, which latter may be allowed to remain permanently in position in the frame. The engine is preferably arranged with the cylinder G extending forward, while the drive connection to the rear axle extends in a downward and rearward direction. This arrangement permits of arranging the entering-slot $f$ for the crank-shaft so that the bearings at the lower ends of said slots will be arranged to receive the stress due to the load on the drive-chain. Furthermore, by constructing the engine so that the crank turns under in the forward stroke of the piston the stress on the crank during the forward travel of the piston will also be directly upon the bearings at the lower end of the slot $f$. Thus the detachable bearing-block D is subjected to but slight stress.

The frame A forms the support for the vehicle-body, (not shown,) and it is supported on the axles H and I, preferably by forwardly and rearwardly inclined spring-arms J. These spring-arms are secured to the under side of the longitudinal bars $a$ of the frame, which are preferably formed of angle-bars and at their free ends are secured to the axles.

In order that the drive-chain K, which connects the sprocket L on the crank-shaft with the sprocket M on the drive-axle, may be maintained at uniform tension during the flexing of the spring-arms J under load, the crank-shaft N is located approximately at the center of movement of said arms. This arrangement is possible by reason of the fact that the engine is arranged with its cylinder extending forward. This brings the vertical plane of the crank-shaft in line with the point of bending of the spring-arms. Furthermore, the casing is arranged with its axial plane substantially in the horizontal plane of the lower leaf of the springs, and thus the axis of the shaft will substantially coincide with the center of turning of the spring-arms.

The valves and the igniter for the engine are preferably operated by the longitudinally-extending shaft O, which is driven from the crank-shaft through the medium of worm-gears. For housing this mechanism I preferably form integral with the casing B the projecting casing P, which also forms the bearings Q for the shaft O. A complementary portion R of this casing is formed integral with the block D and, together with the detachable plate S for the casing P, the mechanism will be completely housed. The crank-shaft N extends across the frame A and is preferably journaled in the bearing T and at its outer end secured to the longitudinal bar $a$ of the frame. In the space between this bearing and the crank-casing is arranged the fly-wheel U and the transmission-gearing V. To permit of removing the crank-shaft from the casing B through the slot $f$, clearance must be provided for the fly-wheel, and to this end the forward cross-bar $b$ of the frame is preferably bent downward, both to form a support below the casing and also to give clearance for the fly-wheel during the attachment of the shaft.

What I claim as my invention is—

1. The combination with a crank-shaft of a casing therefor, having an opening therein for the passage of the crank and entering-slots in its opposite walls for the reception of the crank-shaft, filling-blocks for closing said entering-slots and a cap for closing said opening.

2. The combination with a crank-shaft of a crank-casing provided with entering-slots in its opposite walls for the passage of the shaft, filling-blocks for said entering-slots and means for clamping the portions on opposite sides of said slots upon said blocks.

3. The combination with the crank-shaft of a casing therefor having substantially parallel sides, walls slotted for the reception of the crank-shaft and an opening at the top for the entrance of the crank, part bearings for the crank formed at the lower ends of said entering-slots, filling-blocks for said entering-slots forming complementary portions of said bearings, means for adjusting said blocks in said slots and means for clamping the casing on opposite sides of said slots against said blocks.

4. The combination with the crank-shaft of a casing having side walls slotted for the reception of said shaft projecting flanges bounding said slots, part bearings formed at the lower ends of said slots, and complementary bearing-blocks adjustably embracing said flanges and clamping-bolts passing through said blocks and flanges for binding the same together.

5. The combination with the crank-shaft of a casing having sides slotted for the reception of said shaft, said slots being inclined to the longitudinal axis of the casing, flanges bounding said slots, part bearings for the shaft formed at the lower ends of said slots, complementary bearing-blocks filling said slots and embracing said flanges, keys passing through key-slots in said blocks, and flanges and clamping-bolts also passing through said blocks and flanges, and serving to bind the same together.

6. The combination with the crank-shaft of a casing having side walls slotted for the reception of said shaft, bearings for said shafts formed at the lower ends of said slots, complementary bearing-blocks, filling said slots, a part gear-housing integral with said casing, concentric with the shaft, and a complementary part of said gear-housing integral with said bearing-block.

7. The combination with a frame of a crank-casing extending across said frame and secured thereto at its opposite ends, and a cylinder secured to one end of said crank-casing free from other attachment to said frame.

8. The combination with a frame comprising longitudinal bars and cross-bars of a crank-casing extending between said longitudinal bars and secured at its opposite ends to said cross-bars and a cylinder detachably secured to one end of said casing and projecting therefrom beyond said cross-bar, said cylinder being otherwise unattached to the frame.

9. The combination with a frame of an integral crank-casing extending across said frame and secured thereto at its opposite ends, the side walls of said casing being slotted for the entrance of the crank-shaft, filling-blocks for said slots and means for clamping portions upon opposite sides of said slots against said blocks to form of said casing a rigid strut for strengthening said frame.

10. The combination with the engine and the drive-axle of a crank-casing having entering-slots in opposite side walls thereof for the reception of the crank, said slots being inclined to the longitudinal axis of the casing, part bearings formed in the lower ends of said slots adapted to receive the stress of the driving connection to said axle and complementary bearings filling said entering-slots and secured therein.

11. The combination with the drive-axle of an engine arranged horizontally in a plane above said axle with the cylinder extending forward and with the piston-rod adapted to turn under when under the actuation of the piston, of a crank-shaft for said engine, a chain-drive connection between said crank-shaft and axle, a crank-casing having opposite walls thereof, slotted for the entrance of said crank, part bearings at the lower ends of said slots for said crank-shaft adapted to receive the stress due to the load on the chain, and also the stress of the actuating stroke of the piston and complementary bearings filling said slots and secured therein.

12. The combination with a crank-shaft, of a casing therefor, having an opening therein for the passage of the crank, and entering-slots in its opposite walls for the reception of the crank-shaft and filling-blocks for closing said entering-slots.

13. The combination with a crank-shaft, of a casing therefor, having an opening therein for the passage of the crank, inclined entering-slots in its opposite walls for the reception of the crank-shaft, and filling-blocks for closing said entering-slots.

14. The combination with a crank-shaft, of a casing therefor having substantially parallel sides, walls slotted for the reception of the crank-shaft and an opening at the top for the entrance of the crank, part bearings for the crank formed at the lower ends of said entering-slots, and filling-blocks for said entering-slots forming complementary portions of said bearings.

15. The combination with a crank-shaft, of a casing therefor having substantially parallel sides, walls slotted for the reception of the crank-shaft and an opening at the top for the entrance of the crank, part bearings for the crank formed at the lower ends of said entering-slots, filling-blocks for said entering-slots forming complementary portions of said bearings, and means for adjusting said bearings in said slots.

In testimony whereof I affix my signature in presence of two witnesses.

NORMAN T. HARRINGTON.

Witnesses:
 Jas. P. Barry,
 H. C. Smith.